United States Patent [19]

Shepherd

[11] 4,207,142
[45] Jun. 10, 1980

[54] PAPER SIZING AGENTS
[75] Inventor: David Shepherd, Whitehall, Bristol, England
[73] Assignee: Tenneco Chemicals, Inc., Saddle Brook, N.J.
[21] Appl. No.: 917,777
[22] Filed: Jun. 21, 1978
[30] Foreign Application Priority Data
Jun. 28, 1977 [GB] United Kingdom ............ 27091/70
[51] Int. Cl.² .................. D21H 3/08; D21H 3/10
[52] U.S. Cl. .................. 162/158; 106/213; 260/346.74; 162/179; 162/180
[58] Field of Search ............ 162/158, 180, 179; 260/346.74; 106/213

[56] References Cited
U.S. PATENT DOCUMENTS
3,821,069  6/1974  Wurzburg ................ 162/158
4,086,251  4/1978  Cengel et al. ............ 260/346.74

FOREIGN PATENT DOCUMENTS
500349  2/1939  United Kingdom ............ 162/179

Primary Examiner—S. Leon Bashore
Assistant Examiner—William F. Smith
Attorney, Agent, or Firm—James P. Scullin

[57] ABSTRACT

A sizing agent for use in paper-making comprises an aqueous emulsion of at least one compound of the formula

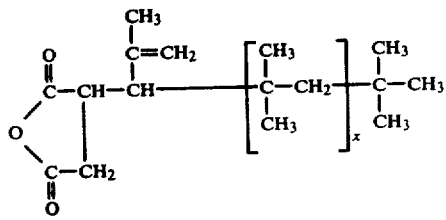

wherein x is an integer from 5 to 16 inclusive. The sizing agent can be used for either internal of surface sizing; and is effective in the absence of, or in the presence of, a retention aid.

22 Claims, No Drawings

PAPER SIZING AGENTS

This invention relates to the sizing of paper and is concerned, in particular, with improved paper sizing agents, processes for their preparation and processes for the manufacture of sized paper products employing such improved paper sizing agents.

In this specification, the term "paper" is used, for convenience, to mean all forms of paper, paperboard and related products whose manufacture involves the employment of a sizing agent upon cellulosic or other fibres, the sizing agent being employed in any of the customary ways, for instance by being added to the cellulosic or other fibre stock from which a web is later made or by being applied to the surface after the web has been formed.

For many years, paper sizing made use of materials, mainly rosin preparations, all of which depended for their sizing effect upon the formation of electrostatic types of bond between the sizing agent and the cellulosic or other fibres. In more recent times, sizing agents have been developed whose operation may also involve the formation of chemical bonds and these are known as "reactive" sizing agents.

It is now known that many sizing agents do not necessarily fall into one or other of these two types, even though they may provide adequate sizing. For instance, it may be established that one sizing agent operates largely by the formation of electrostatic bonds, whereas another sizing agent (which may be a very similar product) may operate largely by the formation of chemical bonds. One useful way of testing whether and, if so, to what extent a sizing agent is "reactive" is to effect acetone extraction of a sized paper sheet. If the sheet exhibits no significant difference in sizing, as measured for instance by the 1 minute Cobb test, before and after the extraction operation, this means that even so effective a solvent as acetone has failed to remove any of the sizing agent, which must therefore all be chemically bonded to the paper web. In such a case therefore, the sizing agent can correctly be regarded as reactive, whereas any significant difference in the degree of sizing of the paper sample after acetone extraction means that the sizing agent is operating to an appreciable extent by way of electrostatic bonding.

Accordingly, the term "reactive sizing agent" is not to be understood to imply that the product in question will always operate substantially only by reaction, i.e. by chemical bond formation, and the term is used herein in a way which appears to accord better with the practical situation which often applies, namely that a so-called "reactive" sizing agent will usually operate by chemical bond-formation to a large extent and will often operate substantially entirely in such manner. Most so-called "reactive sizing agents" are of one or other of two types, namely products based upon alkyl ketene dimers and products based upon substituted succinic anhydrides. The present invention relates to the latter type of sizing agent and provides improved preparations based upon succinic anhydride derivatives which are new and which have properties which render them especially and unexpectecly suitable for paper sizing purposes.

It is known that the practical employment of sizing agents of these kinds is dependent upon the preparation of the reaction product, e.g. the substituted long-chain succinic anhydride, in the form of an emulsion, typically in the form of minute particles, each surrounded by a stabilizing coating or layer of an emulsifying agent, for instance a cationic starch. Each coated particle in an emulsion stabilized with a cationic agent thus carries a positive electrical charge and, in operation, such coated particle undergoes two changes upon contact with the fibres which are being made into paper, namely electrostatic discharge and chemical reaction of the reaction product with the hydroxyl groups present in the cellulosic or other fibres.

Many kinds of fortified, reactive and other sizing agents have been proposed in recent times which comprise succinic anhydride derivatives, or related compounds, e.g. glutaric anhydride derivatives. It had previously been discovered that products of improved sizing efficiency could be made by subjecting rosin and unsaturated compounds found in rosin to adduct-forming reactions of the Diels-Alder type, using various simple unsaturated organic acid anhydrides to react with resinates or other unsaturated rosin compounds. Maleic anhydride proved especially suitable for this purpose and the success of so-called "maleated rosin" sizing agents led to the investigation of the sizing efficiency of other reaction products of unsaturated compounds with maleic anhydride. It is well-known that maleic anhydride will undergo adduction with almost all unsaturated compounds which have a conjugated diene structure, but not all of the resultant products have properties which render them suitable for use as paper sizing agents. It is also well-known that maleic anhydride (and other unsaturated dicarboxylic acid anhydrides) will usually undergo a so-called "ene" reaction with compounds having ethylenic unsaturation and specifically the structure:

The Diels-Alder diene reaction involves ring formation with bond shift, whereas the ene reaction involves simple adduction, the ethylenic unsaturation then moving to the next adjacent carbon-carbon bond.

G.B. Pat. No. 957,136 (equivalent to U.S. Pat. No. 3,102,064) discloses a class of substituted cyclic dicarboxylic acid anhydrides which can be prepared by the kinds of reaction just referred to, which include substituted succinic anhydrides, and these products are useful as sizing agents. The relevant compounds are stated to have the general formula:

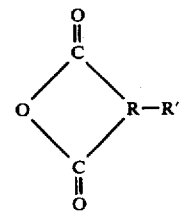

wherein R represents a dimethylene or trimethylene radical and wherein R' is a hydrophobic group containing more than 5 carbon atoms which may be selected from alkyl, alkenyl, and aralkenyl groups.

These prior sizing agents are substituted succinic and glutaric anhydrides which are made by reacting the appropriate unsaturated anhydride with a linear olefin, which has the olefinic double bond in the 1, 2 or 3-position and which can thus be classed as having terminal unsaturation, in view of the location of the double bond in relation to carbon chain length.

G.B. Pat. No. 1,409,830 (equivalent to U.S. Pat. No. 3,821,069) is a later disclosure which relates to succinic anhydride derivatives of the formula:

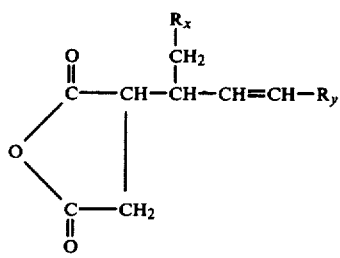

wherein $R_x$ is an alkyl radical containing at least 4 carbon atoms and $R_y$ is an alkyl radical containing at least four carbon atoms. The latter derivatives may be made by reacting maleic anhydride with one or more internal olefins of the formula:

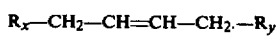

wherein $R_x$ and $R_y$ are as previously defined. The olefins preferably used contain from 14 to 22 carbon atoms, so that the sizing agents are based upon dicarboxylic acid anhydride derivatives containing 18 to 26 carbon atoms and having molecular weights ranging up to approximately 400.

The sizing agents disclosed in the aforementioned prior specifications are used by addition to the fibre stock from which the paper web is made. The products can be regarded as having medium carbon chain lengths, e.g. of up to 24 carbon atoms, and therefore of medium molecular weights.

It has now been discovered that reaction products of maleic anhydride and polybutenes, obtained by reacting maleic anhydride with polymers of butene which are liquids at room temperature, are very useful as paper sizing agents. It has also been discovered, in contrast to the indications given in prior specifications, that useful reaction products are not restricted to those made from hydrophobic carbon-containing groups having terminal unsaturation or from linear olefins having mid-chain unsaturation and, furthermore, that sizing agents can be based upon reaction products with correspondingly higher molecular weights. Furthermore, it has been established that useful and effective sizing agents, whether or not they can be classed as wholly reactive in type, can be prepared which are effective in any mode of use and that great savings in equipment costs and other high cost factors can be made by virtue of the exceptionally good stability of sizing emulsions made by standard techniques from the reaction products of the present invention upon which are based the novel paper sizing agents disclosed below.

According to one aspect of this invention, a method of sizing paper is provided, which comprises intimately dispersing within the wet pulp or, after conversion of the pulp into paper, treating the resultant web with a sizing agent which comprises an emulsion in an aqueous medium containing at least one compound selected from long-chain succinic anhydride derivatives of the general formula:

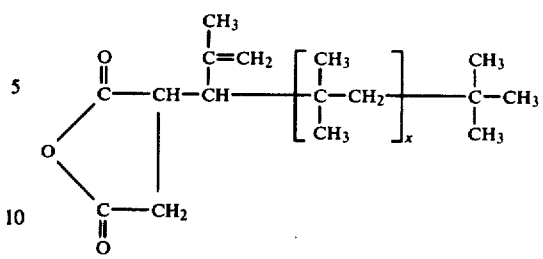

where x is an integer from 5 to 16 inclusive.

Examples of sizing agents typical of those employed in carrying out the sizing of paper according to this invention include sizes prepared by the reaction of maleic anhydride with liquid polymers of butene, the latter having molecular weights from 440-1,000. It is preferable for the sizing agents of this invention to be based upon reaction products which comprise, in effect, maleinised polybutenes of the molecular weight range just quoted. Liquid polymers of butene having molecular weights in the range of 440-1,000 are commercially available. For example, suitable polymers include those sold by Amoco and BP Chemicals under the respective trade names "Indopol" and "Hyvis". A preferred sizing agent of the invention thus contains at least one compound of the above general formula, having a molecular weight approximately in the range from 490 to 1100 and, most preferably, from approximately 600 to 800 (x=7 to x=10).

The selected polybutenes all have the basic structure:

wherein R represents an alkyl radical, the R groups in the $CR_2=$ part of the molecule being the same or different.

The major component can be represented as

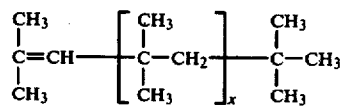

Present also, but only in minor amounts, are the basic structures:

and

Commercially-available polybutenes therefore contain a range of polymeric structures, in which the first-mentioned basic structure predominates. When these products are reacted with maleic anhydride, a number of different reactions occur and the reaction to give the desired reaction product of formula I may be represented as follows:

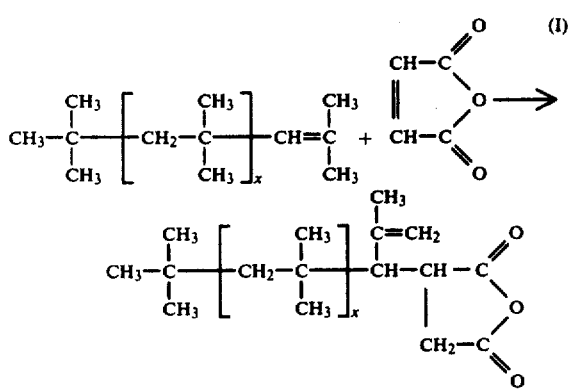

Mechanism

This reaction proceeds via the so-called "ene" reaction:

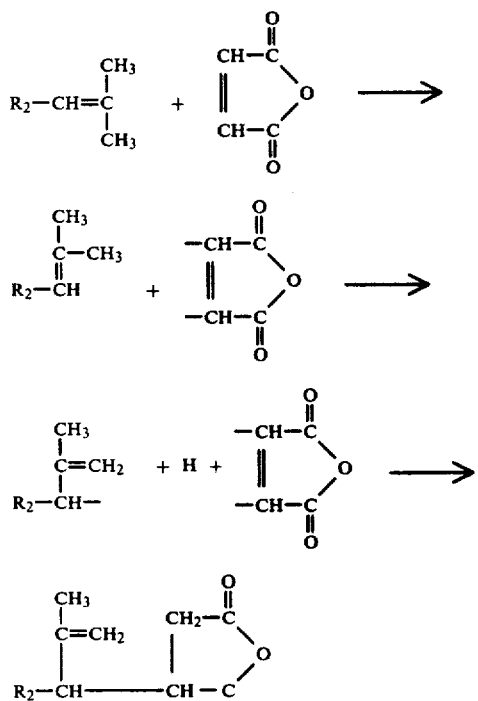

where

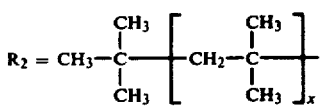

In accordance with another aspect of this invention, therefore, a method is provided for the preparation of long-chain succinic anhydride derivatives of the above formula, which comprises reacting maleic anhydride with a polybutene having a molecular weight in the range from 440–1,000.

As already indicated, one known class of so-called "reactive" sizing agents are those based upon ketene dimers; an example of such a sizing agent currently available as a commercial product is the ketene dimer material known as "Aquapel". This is a sizing agent which has excellent stability, which in part at least is due to its relatively slow rate of reaction. This advantageous stability is accompanied by a low reactivity characteristic, which means in practice that when "Aquapel" is employed as a sizing agent on a conventional paper machine it has not undergone a cure at the size press and is usually still partly uncured when the web has been taken off the machine. Sometimes, full cure of ketene dimer sizes is developed up to 24 hours after manufacture of the web. The other commercially-available "reactive" sizing agent, based upon long-chain succinic anhydride derivatives, in effect has stability and reactivity properties which are the reverse of those typical of ketene dimer sizes. A currently-available reactive size is the product marketed under the name "Fibran" which is believed to be of the kind disclosed in one or other of the above-mentioned prior patent specifications. "Fibran" has a rapid cure characteristic which is indicative of its reactivity, but this is accompanied by a high sensitivity to hydrolytic influences, as is to be expected. This high level of reactivity is an important characteristic of "Fibran", but this imposes severe conditions, because it is an oily material, which has to be emulsified for use and, as it has to be used very soon after manufacture, "Fibran" requires the provision of high-class emulsification equipment in the paper mill. The half-life of a "Fibran" emulsion (i.e. the time during which a sample loses half of its sizing effect through hydrolytic activity) is about 30 mins. Not only is expensive equipment necessary, but also this requires the presence of skilled paper-making personnel. A typical long-chain olefin with mid-chain unsaturation used for the manufacture of "Fibran" is hexadecene-9. This and related materials are relatively difficult and therefore expensive to make.

An object of the present invention is to seek effective sizing agents which have the desirable properties of existing products without the attendant disadvantages and, in particular, provide reaction products which, in addition to the self-evidently desirable characteristic of an effective and reproducible sizing performance, can also be readily made into stable emulsions of long half-life, require conventional emulsification equipment and systems, impose minimum requirements for the provision of special equipment and operating personnel in the paper mill, employ readily-available and inexpensive starting materials and, moreover, are fully compatible with conventional sizing agents. This last characteristic is desirable not only because it opens the way to simultaneous use of two or more sizing systems of different kinds, but also because it greatly simplifies change-over in the mill from one kind of sizing agent to another.

In order to achieve in a single sizing agent, the desirable combination of properties and characteristics listed above, therefore, it is proposed in accordance with the present invention to base sizing agents upon the reaction products of polybutenes and maleic anhydride and the invention is predicated upon the discovery and establishment of the effectiveness of such reaction products and the optimum conditions for their preparation and use as sizing agents in accordance with this invention.

In order that the invention may be readily appreciated, the following Examples are given, relating to the preparation of polybutene/maleic anhydride reaction products, their use as surface and stock sizing agents and their comparison with a commercially-available sizing agent, namely the product comprising a succinic anhydride derivative made from a maleinised olefin reaction product and marketed by National Starch and Chemical Corporation under the trade name "Fibran".

According to another aspect of this invention, a method of making a paper sizing agent comprises forming a reaction product containing at least one compound of the general formula:

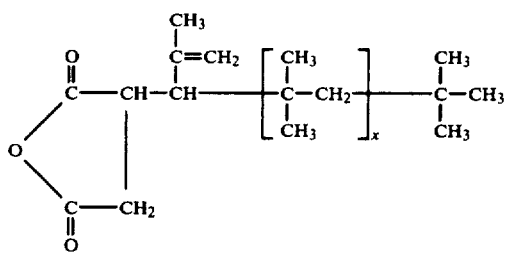

wherein x is an integer from 5 to 16 inclusive, by reacting maleic anhydride with a co-reactant selected from liquid polymers of butene and/or a material containing one or more of such compounds under reaction conditions involving elevated temperature while minimizing polymer formation and forming at least part of the resultant reaction product into an aqueous emulsion.

In one embodiment of the invention, the maleic anhydride and the co-reactant are reacted at a temperature of approximately 215° C. at atmospheric pressure. In another embodiment the maleic anhydride is reacted with the polybutene co-reactant at elevated pressure. This is desirably achieved by reacting the maleic anhydride with the polybutene co-reactant at a temperature of 200° to 250° C. and a pressure of up to 60 atmospheres. An advantageous ratio of maleic anhydride and co-reactant is 1 mole of the letter to 2 moles of maleic anhydride. Another preferred feature of any of these methods resides in removing any unreacted maleic anhydride by distilling it off or, most preferably, it is reacted with a second co-reactant capable of forming an adduct by reaction therewith and such adduct is incorporated into the emulsion. The latter is desirably selected from polybutadienes, chinese gum rosin and soya-bean oil.

In the Examples, percentages are expressed as "percentage total solids", i.e. the amount of sizing agent solids as a percentage of the dry weight of fibre (given as "% s/f" below) and the ratios of polybutene to maleic anhydride employed in making the reaction products of this invention are expressed in molar proportions so far as possible. The Examples are largely presented in the sequence in which various reaction products have been evaluated and modifications made in the conditions of preparation and use of the reaction products, in order to better demonstrate how the critical parameters and preferred features characterising the products and processes of the invention have been devised and in order to facilitate understanding and appreciation of those parameters and features. Though it might be considered that some of the results indicated below demonstrate poor sizing ability, the successful devising of practical sizing agents depends upon a number of factors and not only is it necessary to establish that a given reaction product has the ability to size but also a full evaluation of that reaction product involves establishment of the best conditions of preparation and also of use. Broadly, an effective sizing agent can be taken as one with which sizing is apparent according to the standard 1 min Cobb test when the sizing agent is used at less than 1% s/f; a good rule of thumb is a Cobb value of 25 or less at 0.25% s/f or less.

The maleinised polybutenes obtained by carrying out the above preparations have been made into sizing agents and used in the manufacture of sized paper.

Preparation of Reaction Products

Two general procedures were devised for the manufacture of reaction products of maleic anhydride and various polymers of butene. In one procedure, (a), preparation is carried out at atmospheric pressure and in the other procedure, (b), preparation is carried out at elevated pressure.

(a) Polybutene and maleic anhydride were blanketed with nitrogen and held at 215° C. for a time period. The resultant resin was then decanted, dissolved in hexane and filtered through a "Celite" bed to remove excess maleic anhydride and dark by-products. The solvent was then removed by distillation.

It has been ascertained that treatment of the reaction products made in accordance with this invention are advantageously subjected to filtration through or, in general, treatment with an absorbent clay, such as is typified by the above-mentioned use of "Celite", in order to make substantial reduction in or even effectively eliminate undesirable dark-coloured polymeric products which may be formed in carrying out the maleinisation reaction. Removal of unreacted excess maleic anhydride can also be effected in this way and, alternatively, by a second-stage reaction with another adduct-forming co-reactant, as exemplified below. (Ex. 12).

Polybutene and maleic anhydride were reacted at 240° C. for 5 hours and at a pressure of 40 psi. The unreacted maleic anhydride was then distilled from the mass.

The products are all amber liquids ranging in viscosity depending on the starting polybutene.

Reaction conditions used:
Reaction time: 5-24 hours.
Reaction temperature: 100°-250° C.
Reaction pressure: atmospheric—60 psi
Additives: "Polygard"-antioxidant phenothiazine-polymerisatior inhibitor EXAMPLES 1 to 4

Indopol Polymers ex Amoco

| Polymer | Molecular weight |
|---|---|
| Indopol H25 | 610 |
| Indopol H35 | 660 |
| Indopol H50 | 750 |

EXAMPLE 1(a)

Indopol H25 (1 mole) was reacted with maleic anhydride (2 moles) using preparation technique (a) and the product recovered was emulsified with cationic starch, e.g. "Cato 102", by high-speed mixing or by high-pressure homogenisation.

The emulsion was then used to surface size alum-free paper to yield the following results:

| % s/f | 1.0 | 0.5 | 0.25 | 0.125 |
|---|---|---|---|---|
| 1 min Cobb gsm | 16 | 18 | 21 | 22 |

EXAMPLE 1(b)

The product of Example 1(a) was found to give the following results, when used for internal sizing:

| % s/f | 1.0 | 0.6 | 0.4 | 0.2 |
|---|---|---|---|---|
| 1 min Cobb gsm | — | 24 | — | 68 |

EXAMPLE 2(a)

Indopol H25 (1 mole) and maleic anhydride (2 moles) were reacted using preparation technique (b). The reaction product was formed into an emulsion with cationic starch and evaluated as in Example 1(a), giving the following results:

| % s/f | 1.0 | 0.5 | 0.25 | 0.125 |
|---|---|---|---|---|
| 1 min Cobb gsm | 16 | 16 | 16 | 16 |

The sizing agent of Example 2(a) gave the following results when used as an internal size:

| % s/f | 1.0 | 0.6 | 0.4 | 0.2 |
|---|---|---|---|---|
| 1 min Cobb gsm | — | 17 | — | 24 |

EXAMPLE 3(a)

Indopol H35 was reacted with maleic anhydride as in Example 1(a) and the resultant product was also emulsified and evaluated as described in Example 1(a), giving excellent sizing performance like the reaction products of Ex 1(a) and 2:

| % s/f | 1.0 | 0.5 | 0.25 | 0.125 |
|---|---|---|---|---|
| 1 min Cobb gsm | 19 | 19 | 20 | 21 |

EXAMPLE 3(b)

The product of Example 3(a) was found to give the following results, when used for internal sizing; the better results obtained ("Second run") illustrate the importance of the use of good emulsification techniques and the employment of retention aids; in this case, the sizing agent was made with "Q-Tac" cationic starch and was used with "Kymene" retention aid.

| % s/f | 1.0 | 0.6 | 0.4 | 0.2 |
|---|---|---|---|---|
| First run | 26 | 28 | 36 | 45 |
| Second run | — | 19 | — | 26 |

EXAMPLES 4(a) to 4(c)

Indopol H50 was reacted with maleic anhydride as described in Example 1(a) for Indopol H25 and the resultant product was emulsified and evaluated as described in Example 1(a); the improved results of Ex 4(c) were again obtained using "Q-Tac" and "Kymene", as in Ex 3(b) second run:

| % s/f | 1.0 | 0.6 | 0.4 | 0.2 |
|---|---|---|---|---|
| 4(a) surface sizing | 15 | 16 | 18 | 20 |
| 4(b) internal sizing | — | 33 | — | 64 |
| 4(c) Internal sizing | — | 16 | — | 22 |

EXAMPLE 5

Indopol H50 (1 mole) was reacted with maleic anhydride (2 moles) using the type (b) reaction technique described in Example 2 in relation to Indopol H25. The reaction product was made into a sizing agent emulsion and used on a pilot paper machine for stock sizing, the machine running at 20 ft/min and 15 kg/hr at 60 gsm. The stock used was bleached sulphite pulp, the same at that used for the laboratory tests described in the preceding Examples. The resultant paper was tested off the machine (first test) and then was re-checked after 3 days' storage at ambient temperature (second test). Similar runs were carried out using "Fibran" both before and after the use of the maleinised Indopol H50 sizing agent, so as to obtain comparative results and to monitor any changes occurring in the paper machine conditions. The following results were obtained by the 1 min Cobb test:

| % s/f | 0.2 | 0.1 | 0.075 | 0.05 |
|---|---|---|---|---|
| Indopol H50/MA-first test | 16.8 | 19.3 | 29.6 | 41 |
| Indopol H50/MA-second test | 15.7 | 20 | — | 42 |
| "Fibran"-first test | — | 22.4 | — | 47 |
| "Fibran"-second test | 13.8 | 16.1 | — | 16.6 |

This shows that the sizing agent of the invention undergoes a completion of sizing off the machine comparable with that of "Fibran", whereas "Aquapel" at 0.2% s/f gave a first test value greater than 100 and cured down to 25 in its second test.

EXAMPLES 6 to 9

Hyvis Polymers ex B.P. Chemicals

| Polymer | Molecular weight |
|---|---|
| Hyvis 07 | 440 |
| Hyvis 3 | 650 |
| Hyvis 5 | 780 |
| Hyvis 10 | 1000 |

Hyvis 07 was reacted with maleic anhydride as in Example 1(a), the resultant product was emulsified to form a sizing agent and this was evaluated by being used to surface size alum-free sheets (Ex. 6(a)) and for internal sizing (Ex. 6(b)). The following results were obtained:

| % s/f | 1.0 | 0.5 | 0.25 | 0.125 |
|---|---|---|---|---|
| 6(a) - surface sizing | 16 | 16 | 16 | 19 |

| % s/f | 1.0 | 0.6 | 0.4 | 0.2 |
|---|---|---|---|---|
| 6(b) - internal sizing | — | 41 | — | 66 |

EXAMPLES 7(a) and 7(b)

Reaction products were made (similarly to Example 6) from Hyvis 3 and maleic anhydride and gave the following results:

| % s/f | 1.0 | 0.5 | 0.25 | 0.125 |
|---|---|---|---|---|

| -continued | | | | |
|---|---|---|---|---|
| 7(a) - surface sizing | 16 | 17 | 19 | 25 |
| % s/f | 1.0 | 0.6 | 0.4 | 0.2 |
| 7(b) - internal sizing | 59 | 64 | 69 | 72 |

EXAMPLES 8(a) and 8(b)

Examples 6(a) and (b) were repeated, except for the use of Hyvis 5, with the following results:

| % s/f | 1.0 | 0.5 | 0.25 | 0.125 |
|---|---|---|---|---|
| 8(a) surface sizing | 15 | 16 | 18 | 19 |
| % s/f | 1.0 | 0.6 | 0.4 | 0.2 |
| 8(b) internal sizing | — | 29 | — | 55 |

EXAMPLES 9(a) and 9(b)

Examples 6(a) and 6(b) were repeated, except for the use of Hyvis 10, with the following results:

| % s/f | 1.0 | 0.5 | 0.25 | 0.125 |
|---|---|---|---|---|
| 9(a) surface sizing | 14 | 15 | 16 | 19 |
| % s/f | 1.0 | 0.6 | 0.4 | 0.2 |
| 9(b) internal sizing | — | 35 | — | 63 |

In comparison with the results given above in Examples 1 to 9, a commercially-available reactive sizing agent, namely "Fibran", when tested similarly, gave the following results:

(a) Surface sizing

| % s/f | 1.0 | 0.5 | 0.25 | 0.125 |
|---|---|---|---|---|
| 1 min Cobb gsm | 21 | 19 | 19 | 18 |

(b) Internal sizing

| % s/f | 1.0 | 0.6 | 0.4 | 0.2 |
|---|---|---|---|---|
| 1 min Cobb gsm | 18 | 20 | 20 | 27 |

These emulsions were prepared using a mechanical homogeniser.

Emulsions have also been prepared using a high speed mixer and the final emulsions have a similar particle size to those prepared by using a homogeniser.

The emulsions were evaluated as before, and were found to give similar results.

EXAMPLE 10

Effect and Degree of Maleinisation on Surface Sizing Efficiency

The following results were obtained from emulsions made from (1) the reaction product (HY5MA) of Example 8(a) and (2) such reaction product in various proportions with Hyvis 5 (HY5).

| % s/f | | 1.0 | 0.5 | 0.25 | 0.125 |
|---|---|---|---|---|---|
| Parts of HY5MA | Parts of HY5 | | | | |
| 100 | — | 15 | 16 | 18 | 19 |
| 75 | 25 | 15 | 16 | 17 | 23 |
| 50 | 50 | 16 | 18 | 22 | 43 |
| 25 | 75 | 21 | 44 | 60 | 73 |

EXAMPLE 11

Break point in surface sizing

The reaction product of Example 9 (HY10MA) and "Fibran" were compared:

| % s/f | 0.1 | 0.75 | 0.05 | 0.025 |
|---|---|---|---|---|
| HY10MA | 18 | 22 | 31 | 62 |
| Fibran | 19 | 23 | 26 | 63 |

The results tabulated above in respect of many examples of sizing agents of the invention show how effective the products of the invention are. Best results are achieved with satisfactory emulsification techniques and it is also desirable for the sizing agents to be employed in conjunction with retention aids. It is also shown by the above example that reaction technique (b) substantially eliminates the formation of dark polymeric bodies as by-products in the preparation of the reaction products, which is thus one highly suitable way of obtaining a satisfactory reaction product, though the invention includes other ways of suppressing polymer formation when making the reaction products and also the invention can alternatively be practised by separating the reaction products from any dark-coloured polymeric by-products.

EXAMPLE 12

Removal of excess (unreacted) maleic anhydride

This example illustrates a generally-applicable and preferred reaction technique used in carrying out reaction product preparation according to the invention, whereby another material capable of reacting with maleic anhydride (preferably so as to make a product having a sizing effect) is added to the reaction product obtained by adducting a polybutene with maleic anhydride.

Part A

Preparation of Primary Reaction Product 150 parts by weight of maleic anhydride and 600 parts by weight of "Hyvis" 5 polybutene were admixed and reacted at 240° C. and under a pressure of 40 psi for 5 hours. The final reaction product, which can be regarded as a primary reaction product, contained 2.5% by weight of free maleic anhydride.

Part B

Preparation of Secondary Reaction Product

Three different co-reactants for the free maleic anhydride were employed, to illustrate that the advantageous removal of free maleic anhydride by reaction can be carried out with any of a wide variety of co-reactants which have the ability to form a reaction product with maleic anhydride, even in an existing medium in the form of a primary reaction product. This technique can be preferable to removal of unreacted maleic anhydride by filtration, selective absorption (e.g. on clay) or other removal techniques, especially as it results in the production of additional reaction product having sizing ability.

| | Primary Reaction Product-pbw | Co-reactant-pbw | Reaction temp-°C. | Reaction Time-hr |
|---|---|---|---|---|
| Ex 12 B 1 | 400 | Polybutadiene* | -75 | 195° | 4 |
| Ex 12 B 2 | 400 | Chinese gum rosin | -50 | 160° | 4 |
| Ex 12 B 3 | 295 | Alkali - refined Soya bean oil | -75 | 190° | 4 |

*"Lithene PL" - 0.5 pbw "Polygard" polymerisation inhibitor present.

Part C

Size Test Results

The resultant secondary reaction products, which contained substantially no free maleic anhydride, were each made up into sizing agents in the form of aqueous emulsions and were evaluated by Cobb measurements as described above. The following results were obtained:

| | Surface sizing @ 0.1% S/F |
|---|---|
| Sample | Cobb Value (1 min - gsm) |
| Ex 12 B 1 | 17.8 |
| Ex 12 B 2 | 18.4 |
| Ex 12 B 3 | 20.6 |
| Control (normal prep") | 19.6 |

The sizing agents of the invention are emulsions of highly satisfactory stability and typically have shelf lives of as much as four times that of "Fibran". The sizing agents of the invention may be successfully utilized for the sizing of paper prepared from all types of cellulosic fibres and combinations of cellulosic with non-cellulosic fibres. The cellulosic fibres which may be used include bleached and unbleached sulphate (kraft), bleached and unbleached sulphite, bleached and unbleached soda, neutral sulphite, semi-chemical chemigroundwood, groundwood, and any combination of these fibres. These designations refer to wood pulp fibres which have been prepared by means of a variety of processes which are used in the pulp and paper industry. In addition, synthetic fibres of the regenerated cellulose type, e.g. viscose rayon, can also be used.

The sizing agents impart to paper good resistance to acidic liquids, for example acid inks, citric acid and lactic acid, as compared with paper sized with known sizing agents. In addition to the properties already mentioned, these sizing agents may be employed to give effective sizing in alkaline conditions. This is a highly desirable advantage, as it allows cheap alkaline fillers, e.g. chalk (calcium carbonate) to be used to fill papers. Also, the sizing agents of the invention do not detract from the strength of the paper and can, in fact, increase the strength of the finished sheets. Only mild drying or curing conditions are required to develop full sizing value.

The use of the sizing agents in the manufacture of paper may involve a number of variations in technique any of which may be further modified in light of specific requirements. It is most important to achieve uniform dispersal of the sizing agent throughout the fibre slurry, its addition to the pulp this involving vigorous agitation. Uniform disposal may also be obtained by adding the sizing agent in a fully dispersed form, such as an emulsion, or by the co-addition of chemical dispersing agents to the fibre slurry.

All types of pigments and fillers may be added to the paper which is to be sized by the present method. Such materials include clay, talc, titanium dioxide, calcium carbonate, calcium sulphate, and diatomaceous earths. Other additives, including alum, as well as other sizing agents, can also be used with these sizing agents.

According to a preferred feature of the present invention, the reactive sizing agents are employed in amounts in the range from 0.05% to 3.0% of the dry weight of the pulp, most suitably 1.0% to 2.5% by weight. A cationic starch is preferred as an emulsifying agent for making the reactive sizing agent and it is preferably employed in an amount in the range from 0.5 to 2.0 parts (preferably 1.5) by weight of cationic starch per part of sizing agent. The amount of starch thus typically equals 1½ times the weight of the sizing agent. Where the amount of the latter is 1.0% s/f, therefore, the sizing agent in fact also contains 1½ times that amount of starch, e.g. "Cato 102", to make the reactive emulsion actually used as the sizing agent. Another important factor in the use of the sizing agents of the invention is the use of retention aids, though it can be said that the cationic starch required to maintain the reaction product in a stable emulsion form so that it can be stored and used as required may also operate in the manner of a retention aid. These retention aids, like the starch, either are cationic or are capable of ionizing or dissociating in such a manner as to produce cations or other positively-charged entities. These cationic agents or retention aids have been found useful for bringing the sizing agents into close proximity with the pulp. Materials which may be employed as cationic agents include alum, aluminium chloride, long chain fatty amines having at least 8 carbon atoms in the chain, sodium aluminate (which in acid solution generates alum), cationic-substituted polyacrylamides, chromic sulphate, animal glue, dicyandiamide/formaldehyde condensates, cationic thermosetting resins and cationic polyamide polymers. Particularly interesting cationic starch derivatives include primary, secondary, tertiary and quaternary amine starch derivatives and other cationic nitrogen-substituted starch derivatives, as well as cationic sulphonium and phosphonium starch derivatives. Such derivatives can be prepared from all types of starches including those derived from corn, tapioca, potato, waxy maize, wheat and rice. Moreover, they may be in their original granule form or they may be converted into pregelatinized, cold-water-soluble products. Moreover, the most promising cationic retention aids, in conjunction with reaction products of maleic anhydride and polybutenes, are polyacrylamides, dicyandiamide/formaldehyde condensates and cationic polyamide polymers. These retention aids cannot entirely replace cationic starches as emulsifying agents because of the colloid-forming characteristics of the latter.

Any of the above-noted cationic aids and agents may be added to the stock, i.e. the pulp slurry, either prior to, along with or after the addition of the sizing agent. However, in order to achieve maximum distribution, it is preferable to add the cationic agent either subsequent to or in direct combination with the sizing agent. The actual addition to the stock of either the cationic agent or the sizing agent may take place at any point in the paper-making process prior to the ultimate conversion of the wet pulp into a dry web or sheet. Thus, for example, these sizing agents may be added to the pulp while the latter is in the headbox, beater, hydropulper or stock chest.

In order to obtain good sizing, it is desirable for the sizing agents to be uniformly dispersed throughout the fibre slurry in as small a particle size as possible. One method for accomplishing this is to emulsify the sizing agent prior to its addition to the stock utilizing mechanical means, e.g. high speed agitators or mechanical homogenizers, or by the addition of suitable emulsifying agents. Where possible, it is highly desirable to employ the cationic agent as the emulsifier and this procedure is particularly successful where cationic starch derivatives are concerned. Non-cationic emulsifiers which may be used as emulsifying agents for the sizing agents include hydro-colloids, e.g. ordinary starches, non-cationic starch derivatives, dextrines, carboxymethyl cellulose, gum arabic, gelatin and polyvinyl alcohol. Examples of usable surfactants include polyoxyethylene sorbitan trioleate, polyoxyethylene sorbitol hexaoleate, polyoxyethylene sorbitol laurate, and polyoxyethylene sorbitol oleate-laurate. When such noncationic emulsifiers are used, it is often desirable to separately add a cationic agent to the pulp slurry after the addition to the latter of the emulsified sizing agent. In preparing these emulsions with the use of an emulsifier, the latter is usually first dispersed in water and the sizing agent is then introduced, with vigorous agitation.

As shown by the above examples, the novel sizing agent of the invention can be used for sizing preformed sheets; the products can also be used as internal sizes by mixing the products with an aqueous slurry of pulp, as also is illustrated by the above examples. In general, the sizing agents of this invention can be used in any of the known methods for sizing paper, including application at the size press or a coating apparatus, whether under alkaline, neutral or even slightly acid conditions.

It should also be understood that although it is preferred to use the sizing agent as the sole size, it can be used in conjunction with or in admixture with conventional reactive sizes and non-reactive sizes, such as rosin size, if desired, without departing from the scope of the invention. It will be clear to those skilled in the paper sizing art, however, that any undesirable interaction which might occur between a size according to the invention and another size used with it should be avoided.

What is claimed is:

1. A method of sizing paper, which comprises dispersing within wet paper pulp, or, after conversion of such pulp into paper treating the resultant web with, a sizing agent which comprises an emulsion in an aqueous medium containing at least one compound selected from long-chain succinic anhydride derivatives of the general formula:

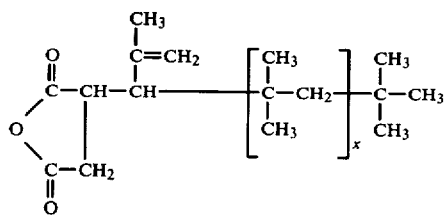

wherein x is an integer from 5 to 16 inclusive.

2. A method according to claim 1, wherein the long-chain succinic anhydride derivative has a molecular weight in the range of from about 490 to about 1100.

3. A method according to claim 1 wherein the long-chain succinic anhydride derivative has a molecular weight in the range of from about 600 to about 800.

4. A method according to claim 1 wherein the long-chain succinic anhydride derivative is a reaction product of maleic anhydride and a liquid polymer of butene.

5. A method according to claim 1 wherein the paper pulp or a web derived therefrom is additionally treated with another reactive size or a non-reactive size.

6. A method according to claim 1 wherein the sizing agent also comprises at least one cationic and/or non-cationic emuslifying agent.

7. A method according to claim 1 wherein the sizing agent is employed in an amount in the range of from about 0.05% to about 3.0% by weight of succinic anhydride derivative based on the dry weight of the pulp.

8. A method according to claim 7, wherein the amount of succinic anhydride derivative is in the range of from about 1.0% to about 2.5% of the dry weight of the pulp.

9. A method according to claim 6 wherein the emulsifying agent comprises a cationic starch employed in an amount in the range of from about 0.5 to about 2.0 parts by weight per part of long-chain succinic anhydride derivative.

10. A method according to claim 9, wherein the amount of cationic starch is about 1.5 parts by weight per part of long-chain succinic anhydride derivative.

11. A method according to claim 6, wherein a retention aid selected from alum, aluminum chloride, long-chain fatty amines, sodium aluminate, cationic substituted polyacrylamides, chromic sulphate, animal glue, dicyandiamide/formaldehyde condensates, cationic thermosetting resins and cationic polyamide polymers is employed in conjunction with the sizing operation.

12. A method according to claim 1, wherein the resultant sized sheet is subjected to a size curing step.

13. A method according to claim 1, wherein the sizing agent is admixed with paper pulp under conditions involving vigorous agitation sufficient to effect uniform dispersal of the sizing agent throughout the slurry of paper fibre.

14. Paper as herein defined, when made or sized by the method according to claim 1.

15. A method of making a paper sizing agent which comprises the steps of (a) forming a first reaction product containing at least one longchain succinic anydride derivative of the general formula:

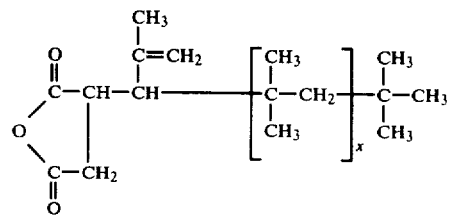

wherein x is an integer from 5 to 16 inclusive, by reacting maleic anhydride with a co-reactant selected from liquid polymers of butene and/or a material containing one or more of such compounds under reaction conditions involving elevated temperature while minimizing polymer formation, (b) forming a second reaction product by reacting unreacted maleic anhydride in said first reaction product with a second co-reactant capable of forming an adduct by reaction therewith, and (c) forming at least part of the resultant mixture of said first reaction product and said second reaction product into an aqueous emulsion.

16. A method according to claim 15, wherein the second co-reactant is selected from polybutadienes, Chinese gum rosin and soya-bean oil.

17. A paper sizing agent having improved stability which comprises an aqueous emulsion of at least one long-chain succinic anhydride derivative of the general formula:

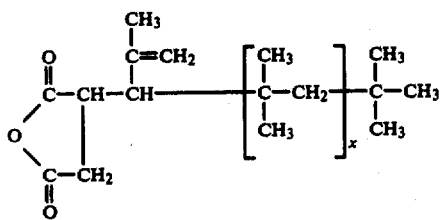

wherein x is an integer from 5 to 16 inclusive.

18. A paper sizing agent according to claim 17, wherein the long-chain succinic anhydride has a molecular weight in the range of from about 490 to about 1100.

19. A paper sizing agent according to claim 17, wherein the long-chain succinic anhydride derivative has a molecular weight in the range of from about 600 to about 800.

20. A paper sizing agent according to claim 17, wherein the long-chain succinic anhydride derivative is a reaction product of maleic anhydride and a liquid polymer of butene.

21. A paper sizing agent according to claim 17, which also comprises a cationic starch as an emulsifier, in an amount ranging from about 0.5 to about 2.0 parts by weight per part by weight of long-chain succinic anhydride derivative.

22. A paper sizing agent according to claim 21, wherein the amount of cationic starch is about 1.5 parts by weight per part by weight of long-chain succinic anhydride derivative.

* * * * *